Sept. 18, 1962     J. J. KISHEL ET AL     3,054,294

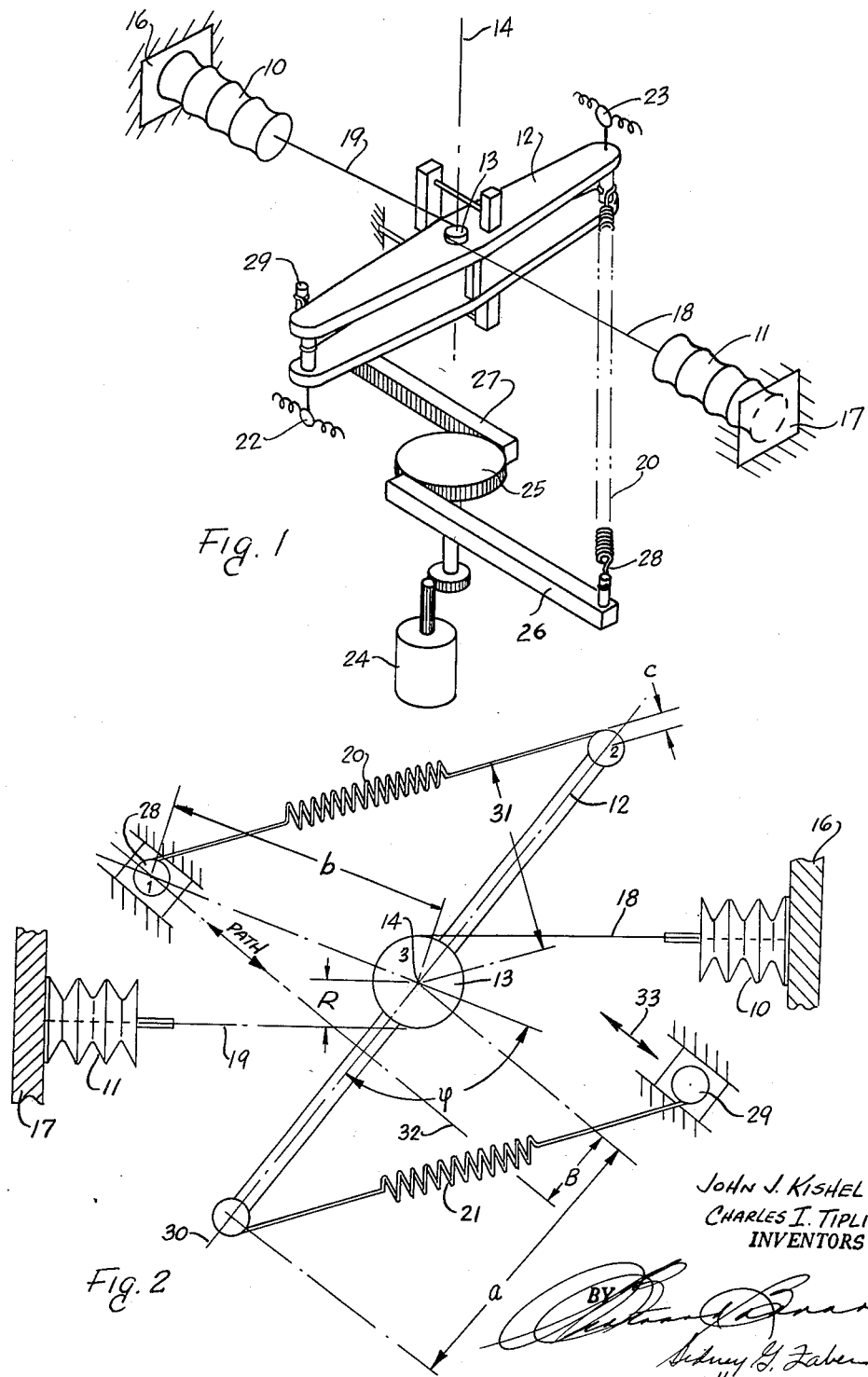

ASTATIC BALANCE DEVICE

Filed Nov. 27, 1959     3 Sheets-Sheet 2

JOHN J. KISHEL
CHARLES I. TIPLITZ
INVENTORS attorneys

Sept. 18, 1962 J. J. KISHEL ET AL 3,054,294
ASTATIC BALANCE DEVICE
Filed Nov. 27, 1959 3 Sheets-Sheet 3

JOHN J. KISHEL AND CHARLES I. TIPLITZ
INVENTORS attorneys

United States Patent Office 3,054,294
Patented Sept. 18, 1962

3,054,294
ASTATIC BALANCE DEVICE
John J. Kishel, Bloomfield, and Charles I. Tiplitz, Cedar Grove, N.J., assignors to General Precision Inc., a corporation of Delaware
Filed Nov. 27, 1959, Ser. No. 855,897
8 Claims. (Cl. 73—386)

This invention relates to an astatic balance and more particularly relates to an astatic torque balance for use in transducers for converting a variable pressure force into an electrical signal with great accuracy, rapid response and uniform and extreme sensitivity.

The theory of the astatic balance is described in detail by D. H. Clewell et al., in the article "Instrumentation for Geophysical Exploration," appearing in Review of Scientific Instruments, 24:4 (April 1953), pages 252–256. The use of the astatic balance for a transducer type device such as a pressure altimeter involves many considerations. Force balance instruments are preferable since the height of the bellows used for pressure monitoring can be fixed, thus eliminating its hysteresis. However, the force balance places a load on the pivot, whose rigidity requirements therefore limit it to higher friction levels.

This, however, does not apply to a torque balance since the forces are balanced out. Thus, a pivot such as the self-compensated flexure pivot of the type set forth in copending application (KFO–64A) Serial No. 855,816 filed November 27, 1959 simultaneously herewith entitled "Self-Compensated Flexure Pivot" in the name of C. Tiplitz, and assigned to the assignee of the present invention, may be used. Moreover, in a torque balance, the influence of spring property changes is reduced by substitution of a mechanical transformation. That is, the transformation involves a change in the angle of the applied force for converting from pressure to position.

In this type of situation, the summation of all the torques in the system must be zero. That is, $\Sigma T = 0$. For the balance to be an astatic balance, a very small change in net torque (or pressure) must give a large change in angle or, $$\sum \frac{\partial T}{\partial \phi} = 0$$

When this balance is operated as a transducer, the change in angle may be sensed with a suitable null balancing system and the system variables are changed until $\Sigma T = 0$ is satisfied.

An important property of this solution is that the percentage sensitivity is actually uniform rather than being a uniform absolute error. This relationship, is also satisfied in a preferred embodiment of the invention by moving the end of the spring means, which balance the applied bellows torque. Specifically, the spring ends are moved along a straight line to substantially simplify manufacturing problems.

Accordingly, a primary object of the invention is to provide a novel astatic balance device.

Another object of the invention is to provide a transducer of the astatic balance type having extreme and uniform accuracy and sensitivity over a wide range of force measurements.

A further object is to provide a transducer that is substantially unaffected by variations in temperature.

A still further object is to provide such a transducer that is small, lightweight, and easily portable.

Another object is to provide such a force transducer having improved sensitivity, uniformly over its range of operation.

A still further object is to provide a transducer that is adapted to be carried by aircraft and other rapidly moving vehicles that is substantially unaffected by temperature change, rapid accelerations, and gravitational forces experienced by such maneuverable vehicles.

A more specific object of the invention is to provide an improved altimeter having uniform and extreme accuracy and sensitivity at altitudes of from about 500 feet below sea level to 100,000 feet or more above sea level.

A still further object is to provide a fast acting altimeter that will accurately respond to altitude variations occurring as fast as 1,000 feet per second or greater with negligible time lag.

Other objects and many additional advantages will be more readily comprehended by those skilled in the art after a detailed consideration of the following specification taken with the accompanying drawings wherein:

FIGURE 1 is a perspective view schematically illustrating a preferred embodiment of the invention.

FIGURE 2 is a top plan view, in schematic form, and illustrating a number of the components in enlarged fashion for more clearly depicting the operation of the preferred embodiment of the invention.

Figure 7:
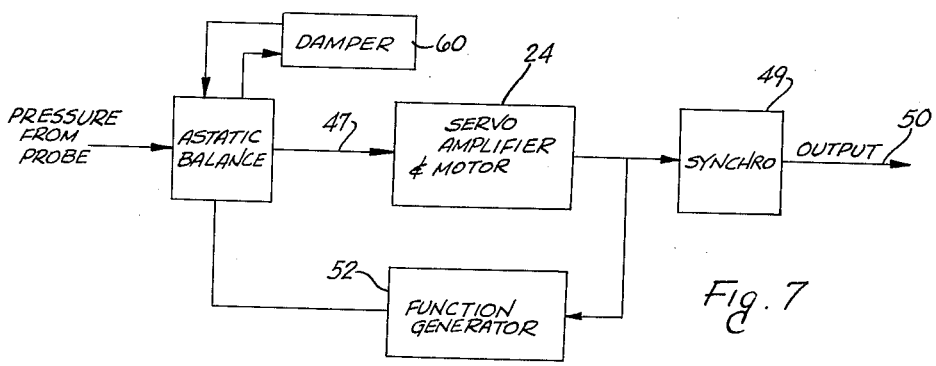
FIGURE 7 is a servo block diagram generally illustrating the overall system operation.

Referring now to the drawings for a detailed consideration of one preferred embodiment of the invention employed as an altimeter or the like, there is generally shown in FIGURE 1, a pair of expandable bellows members 10 and 11 that are employed to accurately detect the ambient pressure and hence the altitude of the craft upon which the mechanism is carried. Each of the bellows 10 and 11 is disposed on opposite sides of a symmetrical beam member 12 that is supported for limited pivoting movement about an axis 14. One end of each bellows is affixed to a frame or housing 16 and 17, respectively, and the other end thereof is connected by means of a tension wire or the like 18 and 19 to opposite sides of its pivot 13. Consequently, whenever the bellows 10 and 11 experience a change in pressure and in response thereto seek to expand or contract, they exert a turning torque upon the beam 12 tending to rotate the beam about its axis 14.

To restrain the rotation of the beam 12 and prevent any appreciable pivoting thereof, there is provided a pair of torque balancing tension springs 20 and 21 connected near opposite ends of the beam 12 and on opposite sides thereof, as best shown in FIGURE 2, thereby to exert a counterbalancing torque upon the beam 12 that is equal and opposite to the torque being exerted by the bellows 10 and 11. Consequently, when the device is in equilibrium, the turning torque being exerted by the bellows 10 and 11 is balanced by the opposing torque being produced by the springs 20 and 21 and the beam remains stationary about its pivot axis 14. Additionally, the translational force being exerted against the beam 12 by the bellows 10 is substantially equal and opposite to that exerted by the bellows 11, and the translational force exerted by the spring 20 is likewise substantially equal to and opposite that of the spring 21. Consequently, since the forces of each pair are equal and oppose one another in direction, it is also evident that the beam 12 is free of net translational forces thereagainst, and its pivot 13 experiences substantially no translational force tending to disturb its orientation or cause extensive stress therein.

With the arrangement of elements as thus far described, it is believed evident that expansion or contraction of the bellows 10 and 11 in response to changes in outside pressure would exert an increased or decreased turning torque upon the beam 12, thereby pivoting the beam 12 about the axis 14 and allowing the bellows 10 and 11 to expand or contract normally.

However, presently available bellows devices suffer from the disadvantage of providing rather large hysteresis errors, wherein the bellows devices do not identically duplicate their former position when exposed to the same pressures, but tend to assume a different expanded or contracted position and hence introduce an error in the pivotal displacement of the beam 12. Therefore, to prevent expansion or contraction of the bellows, there is provided a force balancing system that substantially prevents the bellows devices 10 and 11 from changing dimension, and instead permits variation of only the forces that these devices exert on the beam 12 by providing a unique follow-up balancing system to always maintain the beam 12 substantially in its original position.

Referring again to FIGURES 1 and 2 for an understanding of this preferred force follow-up device, there is provided at each end of the beam 12, a pickoff device 22 and 23, respectively, that serves the function of accurately detecting even the slightest angular displacement of the beam 12 about its pivot 13 to produce an electrical signal. This displacement signal is directed to energize a follow-up motor 24, which through suitable gearing, such as a pinion 25 and racks 26 and 27, positions the opposite sides of each restoring spring 20 and 21 in a transverse direction toward and away from the pivotable beam 12.

More specifically, the opposite end of the spring 20 is connected at position 28 to one end of the rack 26 and the opposite end of spring 21 is likewise connected to one end of rack 27 at a position 29, and both racks 26 and 27 are engaged by pinion 25 to move in opposite directions with rotation of the pinion 25. Consequently, upon being energized by the error signal from the pickoffs 22 and 23, the drive motor 24 rotates the pinion 25 which, in turn, positions the racks 26 and 27 in opposite directions and transverse to the beam 12; and in doing so, simultaneously positions the ends of springs 20 and 21 toward and away from the beam 12 along paths substantially perpendicular to the beam, as best shown in FIGURE 2.

As illustrated in FIGURE 2, this movement of the opposite ends of springs 20 and 21 toward and away from the beam 12 varies the moment arm provided by the spring restoring forces against the beam, whereby as the spring ends 28 and 29 are positioned transversely away from the beam, the moment arm is increased and as the spring ends 28 and 29 are positioned toward the beam 12, the spring moment arms are simultaneously decreased. In this manner, the spring balancing torque provided by the springs 20 and 21 may be automatically varied in a follow-up arrangement to counterbalance the torque exerted by the bellows devices 10 and 11 and thereby maintain the stabilized beam 12 in its neutral position and also to maintain uniform percentage sensitivity.

If spring ends 28 and 29 are momentarily fixed, the restoring springs 20 and 21 will expand or contract as the beam 12 moves clockwise or counter-clockwise in FIGURE 2. At the same time, moment arm 31 in FIGURE 2 will decrease or increase correspondingly. Furthermore, the torque exerted by the bellows will decrease or increase respectively for this motion of the beam 12. It has been found, and will be mathematically demonstrated that for a clockwise rotation of beam 12, the decrease in the moment arm 31 will exactly compensate for the increase in the difference between the increasing force of springs 20 and 21 and the decreasing force exerted by the bellows 10 and 11 on the beam 12 if the path of the spring ends 28 and 29 is exactly perpendicular to the axis 30 of the beam 12. Also, if the beam 12 rotates counter-clockwise, the increase in moment arm 31 will exactly compensate for the decrease in the different between the spring and the bellows forces on the beam 12 if the spring ends 28 and 29 move perpendicular to the axis 30.

More specifically, if the spring ends 28 and 29 are momentarily fixed and if the path of the spring ends is restricted to move perpendicularly to the axis 30 of the beam 12, then it is possible to design the tension springs so that there is no resistance to clockwise or counter-clockwise motion of the beam 12 about axis 14 due to the elastic properties of the springs or the bellows. Consequently, for the condition that the axis 32 and the axis 33 be perpendicular to the axis 30, with proper springs, beam 12 will turn through a large angle about the axis 14 for any pressure change between the inside and outside of the bellows 10 and 11, no matter how small the change. This provides extremely high sensitivity.

The operation of the balance of FIGURE 1 is mathematically analyzed as follows, referring particularly to FIGURE 2. It is seen that;

(1) $$T_S = K_S\left(\frac{ab \sin}{L}\phi + c\right)(L - L_0)$$

where $T_S$ = spring torque
$K_S$ = spring constant
$L_0$ = spring length at zero force and, (2) $$L^2 = a^2 + b^2 - 2ab \cos \phi$$

Taking the derivative of L with respect to $\phi$ in Equation 2, we have, (2a) $$dL = \frac{ab \sin \phi}{L} d\phi$$

Then taking the derivative of $T_S$ with respect to L, in Equation 1 and substituting in Equation 2a, it follows that:

(3) $$\frac{dT_S}{d\phi} = K_S ab \left(\cos \phi\left(1 - \frac{L_0}{L}\right) + \sin^2 \phi \frac{ab L_0}{L^3} + \frac{c}{L} \sin \phi\right)$$

From FIGURE 2, (4) $$T_B = (K_B(L_B - L_{0B}) + PA)R$$

where $T_B$ = torque introduced through the bellows,
$P$ = pressure differential on the bellows
$A$ = bellows area Taking the derivative of $T_B$ with respect to $\phi$ in Equation 4, (5) $$\frac{dT_B}{d\phi} = K_B R \frac{dL_B}{d\phi}$$

From FIGURE 2, (6) $$-dl_B = R d\phi$$

Combining Equations 5 and 6, (7) $$-\frac{dT_B}{d\phi} = K_B R^2$$

Since for static balance, (8) $$\Sigma = 0$$

and for astatic balance, (9) $$\sum \frac{\partial T}{\partial \phi} = 0$$

it follows that (9a) $$0 = \frac{\partial T_L}{\partial \phi} - \frac{T_B}{\partial \phi}$$

Assuming that $L \gg c$ so that $$\frac{c}{L}$$

can be neglected, and substituting Equations 3 and 7 into Equation 9a, we have:

(9b)
$$K_S ab \left[\cos\phi\left(1-\frac{L_0}{L}\right)+\frac{abL_0 \sin^2\phi}{L^3}\right]+K_B R^2 = 0$$

By using a so called "zero length spring," $L_0$, 0 which also eliminates acceleration sensitivity and simplifies temperature compensation, then Equation 9b becomes;

(9c) $\qquad K_S ab \cos\phi + K_B R^2 = 0$, or (9d) $\qquad -b \cos\phi = \frac{K_B R^2}{K_S a}$ This equation expresses the angle $\phi$ in terms of constants for a given structure. Therefore, if the beam is to have a given zero or null position, it follows that the spring ends must move along a straight line. Equation 9d also determines the necessary relation between the properties of the spring, the bellows and the beam dimensions.

To establish the angle $\phi$ in terms of other parameters, from Equation 8, it follows that:

(10)
$$0 = K_S\left(\frac{ab \sin}{L}\phi + c\right)L - (K_B(L_B - L_{0B}) + PA)R$$

Therefore, from Equation 10,

(11) $\qquad \sin\phi = \frac{K_B R(L_B - L_{0B}) + PAR - K_S cL}{K_S ab}$

Substituting Equation 9d into Equation 11,

(12) $\qquad -\tan\phi \cong \frac{PA}{K_B R}$

Figure 3:
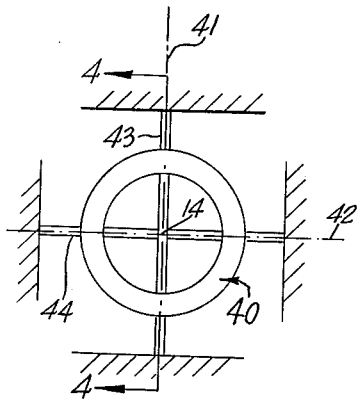
FIGURE 3 is a diagramatic top sectional view for illustrating a preferred suspension for the balance, and the self-compensated pivot thereof.
Figure 4:
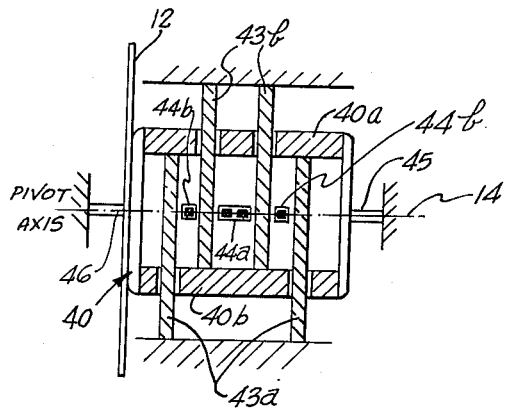
FIGURE 4 is a section view of the flexure pivot shown in FIGURE 3, taken along lines 4—4 of FIGURE 3.

In FIGURES 3 and 4, there is schematically shown details of a preferred pivot means for supporting the astatized member 12. In order to provide the low friction, uniform sensitivity, and accuracy required according to the present invention, there is provided an improvement over what is generally known as a self-compensating flexure pivot.

As shown in FIGURES 3 and 4, the body portion of the preferred pivot generally comprises a substantially cylindrically shaped hollow, symmetrical member 40 adapted to be centrally affixed to the stabilized beam 12. Cylindrical body 40 is supported about each axis 41 and 42, transverse to pivot axis 14, by means of two pairs of flexure strips 43 and 44, respectively. As best shown in FIGURE 4 illustrating the flexure support about transverse axis 41, there is provided an outer pair of flexure strips 43a, flexibly connecting one inner wall 40a of body member 40 to the rigid housing or base and an inner pair of flexure strips 43b, flexibly connecting the opposing inner wall 40b of body member 40 to an oppositely disposed portion of the rigid housing or base. Consequently, the two pairs of flexure strips are set in opposition, whereby changes in the load on body 40 result in an increase of restoring moment in one set equal to the decrease in the other. Also the restoring moment of one pair of flexure strips cancels that of the other. More specifically, if a force or acceleration is applied to the body 40 in a direction parallel to the flexure strips 43, or along transverse axis 41, one pair of the flexure strips are placed in tension and the other pair in compression, whereby the increase in the restoring force of one set is equal to the decrease in the other and the net restoring force on the body is substantially equal to and remains zero. In other words, the overall bending of flexing characteristics of the flexure strips remain constant and essentially negligible despite applied forces and accelerations along the transverse axis 41.

In a similar manner, two pairs of flexure strips 44a and 44b interconnect the pivot body member 40 with the housing or case along the longitudinal axis 42, which is transverse to both the pivot axis 14 and the above mentioned transverse axis 41. In this manner, the body 40 is compensated against forces acting along axis 42. Consequently, by means of the two opposed pairs of flexure strips supporting the pivot body 40 about axes 41 and 42, the body is self-compensated and rendered substantially insensitive to acceleration, gravity or other forces acting along either axis and is substantially ideally balanced. Further, by matching the pairs of flexure strips to respond equally to changes in temperature, the device is also rendered substantially insensitive to changes in temperature and thus there is provided a substantially frictionless pivot means having uniform characteristics along the axes 41 and 42 independently of gravity, acceleration, temperature change or altitude. For a more rigorous mathematical analysis of the theory and operation of compensated flexure pivots, reference is made to the publication identified as Bulletin #86, Engineering Experiment Station Series, issued by the University of Washington in November 1935 and entitled "Flexure Pivots to Replace Knife Edges and Ball Bearings" by F. S. Eastman.

As described in copending application (KFO–64a) Serial No. 855,816, filed simultaneously herewith, there is provided an additional feature and improvement to the above described flexure pivot for the purpose of also rendering the pivot body 40 substantially insensitive to acceleration and other forces in a direction along or parallel to the pivot axis 14. Fine tension wires 45 and 46 are affixed centrally of the pivot body 40 for connecting the opposite ends of the pivot body 40 in tension to the housing along pivot axis 14. The operation of the flexure pivot is then rendered insensitive to forces and accelerations directed along the pivot axis. The additional resisting torque to pivoting introduced by the wires 45 and 46 is compensated for by proper design of the flexure strips so that tension wires 45 and 46 will absorb the forces acting along the pivot axis 14. Thus, any accelerations and forces about all three axes are substantially ineffective in changing the operating characteristics of the pivot 13.

Figure 5:
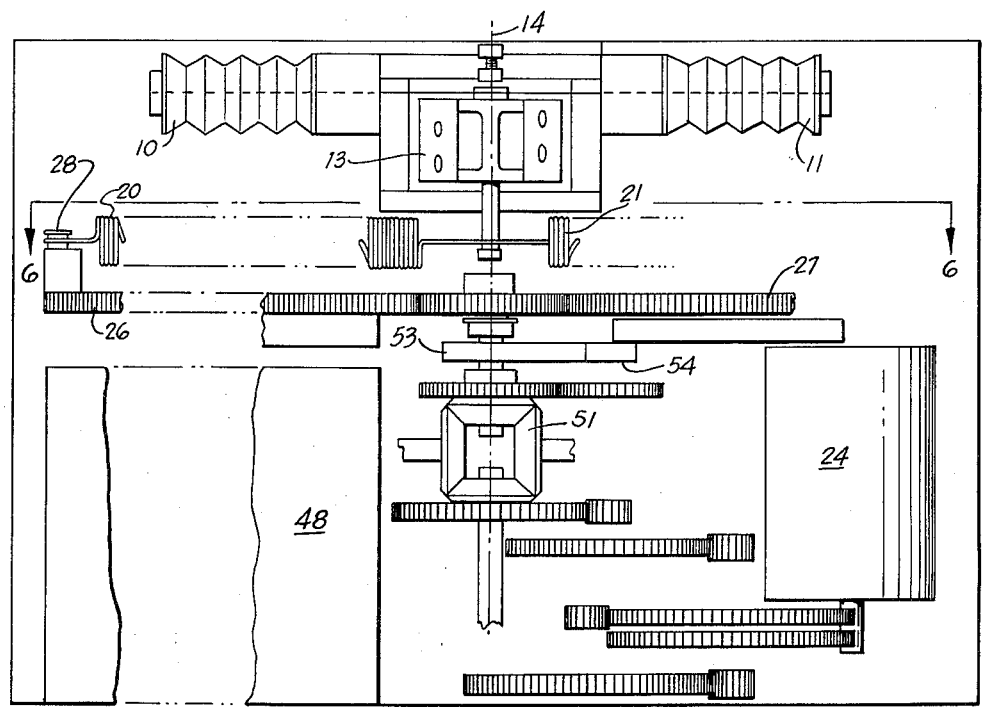
FIGURE 5 is a side elevational view, partially in section, illustrating the preferred embodiment of the invention.
Figure 6:
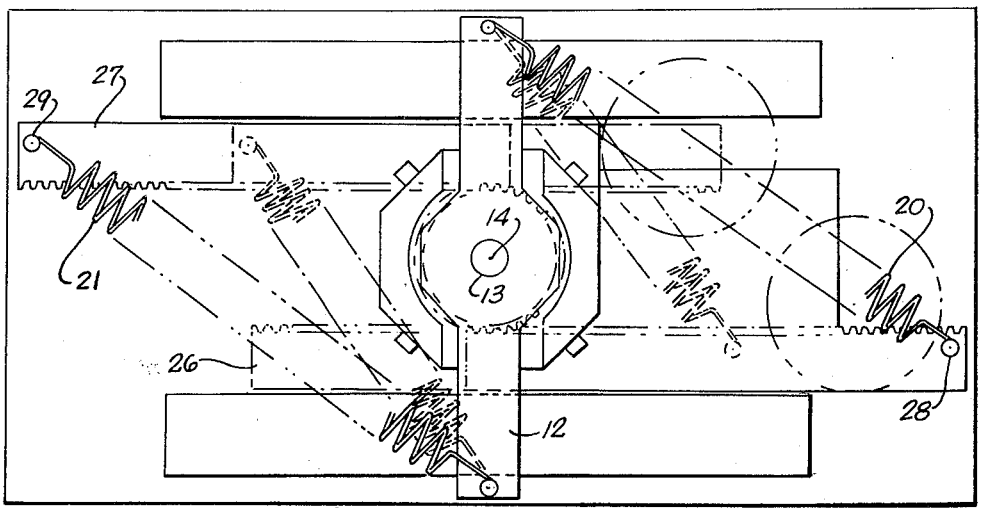
FIGURE 6 is a sectional view of the unit shown in FIGURE 5, along lines 6—6 of FIGURE 5.

FIGURES 5 and 6 illustrate additional details of a preferred embodiment, and FIGURE 7 illustrates the overall system of operation in block diagram form.

As shown in FIGURE 7, the overall system, as described above, responds to atmospheric pressure and hence indicates altitude, to produce a turning force on the beam 12 and thus incrementally pivots the beam 12 to produce electrical signals from pickoffs 22 and 23, which are transmitted over line 47 in FIGURE 7 to an amplifier 48 (FIGURE 5). This error signal is amplified in amplifier 48 and directed to energize motor 24 which in turn positions a synchro or the like 49 to produce an electrical output signal proportional to the pressure or altitude if so desired over output line 50. To restore the beam 12 to its initial position, the motor 24 also operates in feedback through suitable gear reduction and gear differentials, generally designated by numeral 51 in FIGURE 5 to operate a predetermined function generator 52. The function generator 52, generally includes the pinion gear 25 and racks 26 and 27 of FIGURE 1, as well as a cam and cam follower 53 and 54, respectively, as generally shown in FIGURE 5, the latter serving the purpose of rotating the pinion gear in a predetermined manner, thereby to position the ends 28 and 29 of the springs 20 and 21 toward and away from the beam 12 and thereby vary the restoring moment arm exerted by the springs 20 and 21 to restore the beam 12 to its initial position, as desired.

Since the balance is astatic, a damping means schematically illustrated as damping means 60 in FIGURE 7 may be connected to arm 12 to prevent hunting.

Since the above and many other modifications are considered within the skill of those versed in the art after a detailed consideration of the foregoing specification, this invention is to be limited only by the following claims.

What is claimed is:

1. In a force transducer, an elongated member pivotally supported for limited pivoting movement about an axis, substantially identical with a first and second variable force producing means, tension transmitting means each connecting a different one of said force producing means to said elongated member at positions oppositely displaced from said axis to produce a net turning torque tending to pivot the member, first and second expandable springs each having one end connected to said elongated member at a position on opposite sides of said axis and reversedly connected thereto to produce a net torque thereagainst in a direction opposite from that of the first and second force producing means thereby to astatically balance the torque from the force producing means, and each having the opposite end thereof supported for movement in opposite directions substantially transverse to said member thereby to operate astatically, means detecting the slightest pivoting of said member about said axis in response to variation in said force producing means, and means responsive to said rotation detecting means for reversibly positioning the ends of said springs opposite that attached to the elongated member, to restore said member to its initial position.

2. In the transducer of claim 1, said elongated member being pivotally supported about said axis by self-compensated flexure means that are substantially unaffected by acceleration and gravity forces operating about any one of its orthogonal axes.

3. In a pressure sensitive device, a pair of pressure responsive bellows, an astatically balanced member pivotable about a given axis, means oppositely connecting said pressure responsive bellows to said balanced member to exert a zero translational force on the member and to exert a turning torque thereagainst about said axis, a pair of springs oppositely connected to said balanced member to exert a zero translational force thereon and to exert a turning torque thereagainst about said axis in opposition to the torque exerted by said bellows, said springs each being axially positioned at an equal angle to the straight line on the member joining their connected ends thereto, and means for simultaneously positioning the opposite ends of said springs in opposite directions normal to said straight line in response to deviation of said balanced member about said given axis thereby to restore said balanced member to its initial position.

4. In a gas pressure sensitive device, a member pivotable about a given axis, a pair of parallel arranged spring means having opposite ends of each connected to said pivotable member at opposite sides of said given axis, with said spring means forming equal acute angles with said pivotable member thereby to exert a turning torque on said pivotable member, bellows means connected to said pivotable member to exert a turning torque thereagainst in opposition to said spring means, and a pair of reciprocally movable members simultaneously movable in a normal direction and in opposition toward and away from said pivotable member and each being connected to a different one of said spring means, thereby to vary the effective moment arm of the turning torque produced by said spring means with movement of said reciprocally movable members.

5. In a force transducer having a member pivotable about a given axis, a pair of pressure responsive bellows, means oppositely connecting said pressure responsive bellows, to said pivotable member, to exert a zero translational force on the member, and to exert a turning torque thereagainst about said axis, and spring balancing means responsive to deviation of said member about said axis for varying the moment arm and force of a counterbalancing torque against said member, thereby to restore said member to its initial position, said spring balancing means including a pair of springs, each spring having a first end connected to said member at a position on one side of said given axis and the other end of said spring being connected for reciprocal movement along a straight line path perpendicular to said member at a position other than the position where the first end of said spring is connected to said member, and means for simultaneously positioning the opposite ends of said springs in opposite directions normal to said straight line path in response to deviation of said pivotable member about said given axis, thereby to restore said pivotable member to its initial position, said pivotable member being supported by opposed flexure pivot means about each axis orthogonal to said given axis, and by torsion wires along said given axis.

6. In a transducer having a member rotatable about an axis, means for applying a rotative torque to said rotatable member in proportion to variations in a force, a pair of pressure responsive bellows, means oppositely connecting the pressure responsive bellows to said rotatable member to exert a zero transitional force on the rotatable member, and to exert a turning torque thereagainst about said axis, spring means having an end thereof connected to said rotatable member at a position displaced from said pivot axis and having a second end thereof supported for movement along a straight line path, in a direction transverse to said rotatable member and not along the axis of said spring means, whereby variation in the position of the movable end of said spring means, varies both the angle of torque being supplied by said spring means as well as the distance between the ends of the spring means in accordance with the astatic requirement, said spring means applying a torque to said rotatable member in a direction opposite to that being provided by said pressure responsive bellows, thereby tending to balance the torque generated by the pressure responsive bellows, and means responsive to pivotal displacement of said rotatable member for positioning said movable end of the spring means along said straight line path, to restore said rotatable member to its initial position, said responsive means including an electrical pickoff for producing an electrical signal and including means energized by said electrical signal to provide the transducer output signal.

7. In a force transducer, a member, flexure means, supporting said member for restrained pivoting movement about a given axis and preventing translatory movement thereabout and both rotative and translatory movement about any other axis, means responsive to a variable force for applying a first variable torque to said pivoted member operating about said axis, said means applying said torque thereto with a constant effective moment arm distance with respect to said pivoted member, means for applying a balancing torque to said pivoted member to astatically counter-balance the torque being applied by said force means, said balancing torque means being variable to change both its absolute force and its effective moment arm distance, and follow-up means responsive to deviation of said pivoted member about said axis for energizing said balancing torque means, thereby to restore said pivoted member to its initial position, said balancing torque means including a spring having one end connected to said member at a first position displaced from said pivot axis and an opposite end thereof supported by a movable means, said opposite end being reciprocally positionable in a direction transverse to that straight line on said member defined between said pivot and the first position of said member; and said follow-up means actuating said movable means to reciprocally position said opposite end of the spring, thereby to increase and decrease the effective moment arm of the spring as well as varying the length of the spring, said variable force responsive means including a pair of expandable bellows with each being connected to said member at different positions equidistant from said axis, and said balancing spring means including a pair of said springs having one end of each connected to the member at a different position equidistant from said axis.

8. In a pressure sensitive device, a balanced member pivotable about a given axis, means responsive to a variable force proportional to pressure for exerting a proportional turning torque against said pivotable member, counter-balancing torque means responsive to deviation of said pivotable member for exerting a restoring torque against said pivotable member to oppose said torque and to restore said pivotable member to its initial position, said counter-balancing torque means including a force transmitting member, and means for varying the moment arm of applying said force transmitting member to said pivotable member in response to deviation of said pivotable member about said given axis, said force transmitting member including a spring means having one end thereof connected to said pivotable member at a position remote from said pivot axis and the other end thereof being supported for movement along a straight line path in a direction transverse to the line on said pivotable member defined by the location of said pivot and the connected end of said spring means, a pair of force exerting means and a pair of said spring means, and said pivotable member being supported by opposed flexure pivot means about each axis orthogonal to said given axis and by torsion wires along said given axis.

References Cited in the file of this patent

UNITED STATES PATENTS

| | | |
|---|---|---|
| 1,599,466 | Gourdou | Sept. 14, 1926 |
| 1,870,344 | Neumann | Aug. 9, 1932 |
| 1,983,486 | Paulin | Dec. 4, 1934 |
| 2,337,152 | Clewell | Dec. 21, 1943 |
| 2,589,709 | La Coste et al. | Mar. 18, 1952 |
| 2,614,432 | Cloud | Oct. 21, 1952 |
| 2,735,731 | Freebairn et al. | Feb. 21, 1956 |
| 2,907,563 | Verde et al. | Oct. 6, 1959 |